(12) United States Patent
Berry (10) Patent No.: US 9,366,440 B2
(45) Date of Patent: Jun. 14, 2016

(54) FUEL NOZZLES WITH MIXING TUBES SURROUNDING A LIQUID FUEL CARTRIDGE FOR INJECTING FUEL IN A GAS TURBINE COMBUSTOR

(75) Inventor: Jonathan Dwight Berry, Simpsonville, SC (US)

(73) Assignee: GENERAL ELECTRIC COMPANY, Schenectady, NY (US)

(*) Notice: Subject to any disclaimer, the term of this patent is extended or adjusted under 35 U.S.C. 154(b) by 1105 days.

(21) Appl. No.: 13/343,417

(22) Filed: Jan. 4, 2012

(65) Prior Publication Data

US 2013/0167539 A1    Jul. 4, 2013

(51) Int. Cl.
 *F23R 3/28* (2006.01)

(52) U.S. Cl.
 CPC ....... *F23R 3/286* (2013.01); *F23D 2900/00008* (2013.01); *Y02E 20/16* (2013.01)

(58) Field of Classification Search
 CPC F23R 3/286; Y02E 20/16; F23D 2900/00008
 See application file for complete search history.

(56) References Cited

U.S. PATENT DOCUMENTS

| | | | | |
|---|---|---|---|---|
| 4,100,733 A | * | 7/1978 | Striebel et al. | 60/39.463 |
| 4,262,482 A | * | 4/1981 | Roffe et al. | 60/736 |
| 4,408,461 A | * | 10/1983 | Bruhwiler et al. | 60/737 |
| 4,720,970 A | * | 1/1988 | Hudson et al. | 60/804 |
| 5,259,184 A | * | 11/1993 | Borkowicz | F23D 14/00 |
| | | | | 60/39.55 |
| 5,481,867 A | * | 1/1996 | Dubell et al. | 60/804 |
| 5,983,643 A | | 11/1999 | Kiesow | |
| 6,397,602 B2 | | 6/2002 | Vandervort et al. | |
| 6,415,608 B1 | * | 7/2002 | Newburry | F23C 13/00 |
| | | | | 417/170 |
| 6,968,693 B2 | | 11/2005 | Colibaba-Evulet et al. | |
| 7,516,607 B2 | * | 4/2009 | Farhangi | F23C 13/06 |
| | | | | 431/170 |
| 7,631,499 B2 | | 12/2009 | Bland | |
| 7,752,850 B2 | * | 7/2010 | Laster | F23R 3/343 |
| | | | | 60/39.27 |
| 8,550,809 B2 | * | 10/2013 | Uhm | F23R 3/10 |
| | | | | 431/12 |

(Continued)

FOREIGN PATENT DOCUMENTS

| | | |
|---|---|---|
| CN | 1601181 A | 3/2005 |
| EP | 2224172 A2 | 9/2010 |
| EP | 2573469 A2 | 3/2013 |

OTHER PUBLICATIONS

W. R. Laster & E. Anoshkina, Catalytic Combustor for Fuel-Flexible Turbine, U.S. Department of Energy, Oct. 2004 through Oct. 2007.

(Continued)

*Primary Examiner* — Gerald L Sung
*Assistant Examiner* — Carlos A Rivera
(74) *Attorney, Agent, or Firm* — Fletcher Yoder, P.C.

(57) ABSTRACT

Fuel nozzles for gas turbines are provided that include liquid fuel cartridges. In one embodiment, a fuel nozzle includes a fuel plenum plate separating an air plenum from a fuel plenum. The fuel nozzle also includes a plurality of mixing tubes extending through the fuel plenum from the fuel plenum plate to a face plate. Each mixing tube includes an air inlet configured to receive air from the air plenum, a fuel inlet disposed in a tube wall within the fuel plenum to direct fuel from the fuel plenum into the mixing tube to produce a fuel-air mixture, and a fuel-air outlet configured to discharge the fuel-air mixture away from the face plate into a combustion region. The fuel nozzle further includes a liquid fuel cartridge extending through the air plenum and the fuel plenum to the face plate. The liquid fuel cartridge includes a liquid fuel passage.

19 Claims, 7 Drawing Sheets

(56) References Cited

U.S. PATENT DOCUMENTS

| | | | | |
|---|---|---|---|---|
| 8,894,407 | B2* | 11/2014 | Stoia | F23R 3/286 431/12 |
| 8,984,887 | B2* | 3/2015 | Berry | F23R 3/36 60/737 |
| 9,004,912 | B2* | 4/2015 | Stoia | F23R 3/286 431/144 |
| 9,033,699 | B2* | 5/2015 | Stoia | F23R 3/286 431/144 |
| 2008/0078183 | A1 | 4/2008 | Ziminsky et al. | |
| 2009/0044537 | A1 | 2/2009 | Boardman et al. | |
| 2010/0008179 | A1 | 1/2010 | Lacy et al. | |
| 2010/0031662 | A1 | 2/2010 | Zuo | |
| 2010/0084490 | A1 | 4/2010 | Zuo et al. | |
| 2010/0186413 | A1 | 7/2010 | Lacy et al. | |
| 2010/0192579 | A1* | 8/2010 | Boardman et al. | 60/737 |
| 2010/0192581 | A1 | 8/2010 | Ziminsky et al. | |
| 2010/0218501 | A1 | 9/2010 | York et al. | |
| 2010/0287942 | A1 | 11/2010 | Zuo | |
| 2010/0293955 | A1* | 11/2010 | Berry et al. | 60/742 |
| 2011/0016866 | A1* | 1/2011 | Boardman et al. | 60/730 |
| 2011/0113783 | A1* | 5/2011 | Boardman et al. | 60/723 |

OTHER PUBLICATIONS

Search Report and Written Opinion from corresponding EP Application No. 12198311, dated Jul. 25, 2013.

Unofficial English Translation of Chinese Office Action issued in connection with corresponding CN Application No. 201310001387.8 on Sep. 8, 2015.

* cited by examiner

FUEL NOZZLES WITH MIXING TUBES SURROUNDING A LIQUID FUEL CARTRIDGE FOR INJECTING FUEL IN A GAS TURBINE COMBUSTOR

BACKGROUND OF THE INVENTION

The subject matter disclosed herein relates to fuel nozzles and more specifically, to fuel nozzles for gas turbine combustors.

In general, gas turbines combust a mixture of compressed air and fuel within a combustor to produce hot combustion gases. The hot combustion gases rotate blades of the turbine to rotate a shaft that drives a load, such as an electrical generator. Fuel nozzles within the combustor inject fuel and air into the combustor. In some designs, the fuel nozzles include one or more mixing tubes that pre-mix the fuel and air before the fuel and air enters the combustion zone. For example, the mixing tubes may be employed to mix a gaseous fuel with air. However, the fuel nozzles may not be designed to direct liquid fuel through the mixing tubes. For example, the mixing tubes may become clogged by liquid fuel due to the small size of the mixing tubes.

BRIEF DESCRIPTION OF THE INVENTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In a first embodiment, a system includes a gas turbine fuel nozzle. The gas turbine fuel nozzle includes a fuel plenum plate separating an air plenum from a fuel plenum. The gas turbine fuel nozzle also includes a plurality of mixing tubes extending through the fuel plenum from the fuel plenum plate to a face plate, wherein each mixing tube comprises an air inlet configured to receive air from the air plenum, a fuel inlet disposed in a tube wall within the fuel plenum to direct fuel from the fuel plenum into the mixing tube to produce a fuel-air mixture, and a fuel-air outlet configured to discharge the fuel-air mixture away from the face plate into a combustion region. The fuel nozzle further includes a liquid fuel cartridge extending through the air plenum and the fuel plenum to the face plate, wherein the liquid fuel cartridge comprises a liquid fuel passage.

In a second embodiment, a system includes a gas turbine fuel nozzle. The gas turbine fuel nozzle includes a fuel plenum plate and a face plate spaced from the fuel plenum plate to define a fuel plenum therebetween. The face plate includes mixing tube apertures disposed circumferentially around a liquid fuel cartridge aperture. The gas turbine fuel nozzle also includes a plurality of mixing tubes extending through the fuel plenum from the fuel plenum plate to a face plate. Each mixing tube comprises an air inlet configured to receive air from the air plenum, a fuel inlet disposed in a tube wall within the fuel plenum to direct fuel from the fuel plenum into the mixing tube to produce a fuel-air mixture, and a fuel-air outlet configured to discharge the fuel-air mixture away from the face plate into a combustion region. The fuel nozzle further includes a liquid fuel cartridge extending through the fuel plenum plate. The liquid fuel cartridge includes a nozzle portion disposed in the liquid fuel cartridge aperture, a liquid fuel passage coupled to the nozzle portion, and an air passage disposed around the liquid fuel passage.

In a third embodiment, a system includes a gas turbine fuel nozzle. The gas turbine fuel nozzle includes a plurality of sector nozzles disposed adjacent to one another to form a circular cross section. Each sector nozzle of the plurality of sector nozzles includes a fuel plenum plate separating an air plenum from a fuel plenum plate. Each sector nozzle of the plurality of sector nozzles also includes a plurality of mixing tubes extending through the fuel plenum from the fuel plenum plate to a face plate. Each mixing tube comprises an air inlet configured to receive air from the air plenum, a fuel inlet disposed in a tube wall within the fuel plenum to direct fuel from the fuel plenum into the mixing tube to produce a fuel-air mixture, and a fuel-air outlet configured to discharge the fuel-air mixture away from the face plate into a combustion region. The gas turbine fuel nozzle also includes a liquid fuel cartridge that includes a liquid fuel passage and an air passage disposed in a concentric arrangement. The liquid fuel passage and the air passage are configured to output liquid fuel and air away from the face plate into the combustion region.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

The present disclosure is directed to sector nozzles that include liquid fuel cartridges. Each sector nozzle may have a segmented shape, such as a wedge shaped cross section, that allows the sector nozzle to fit together with adjacent sector nozzles to form an annular ring of sector nozzles within a combustor of a gas turbine. A series of mixing tubes are disposed within each sector nozzle to produce a fuel-air mixture that is directed to the combustion zone. In particular, the mixing tubes direct air from an air plenum near the combustor end cover, through the mixing tubes to the nozzle face. A fuel plenum surrounds the mixing tubes and gaseous fuel from the fuel plenum is directed into the mixing tubes through apertures in the side of the tubes to produce the fuel-air mixture. The sector nozzles also may include a liquid fuel cartridge that directs liquid fuel, such as fuel oil or other distillates, to the combustion zone. Accordingly, the sector nozzles described herein may provide the flexibility to operate on liquid fuel, gaseous fuel, or a combination thereof. The liquid fuel cartridge may be located within the sector nozzle between the mixing tubes, and, in certain embodiments, may be radially surrounded by the mixing tubes. Accordingly, the liquid fuel may be directed through the liquid fuel cartridge to the combustion zone without flowing through the mixing tubes, which could be fouled by the liquid fuel.

The liquid fuel cartridge extends from the combustor end cover through the fuel plenum to the nozzle face. Within the fuel plenum, the liquid fuel cartridge may be mounted within a tube that isolates the liquid fuel cartridge from the fuel within the fuel plenum. The liquid fuel cartridge includes an inner passage for directing liquid fuel through the liquid fuel cartridge and may also include one or more outer passages for directing air and/or water through the liquid fuel cartridge. A nozzle portion may be located at the end of the liquid fuel cartridge to direct the fuel into the combustion zone. According to certain embodiments, the nozzle portion expels the liquid fuel radially outward toward mixing tubes that are disposed radially around the liquid fuel cartridge. The mixing tubes may be disposed radially around the liquid fuel cartridge in a pattern designed to promote efficient mixing of the fuel and air. Further, in certain embodiments, a perimeter row of mixing tubes may be disposed around the outer circumference of the sector nozzle to inhibit liquid fuel from flowing past the sector nozzle towards the liner.

Figure 1:
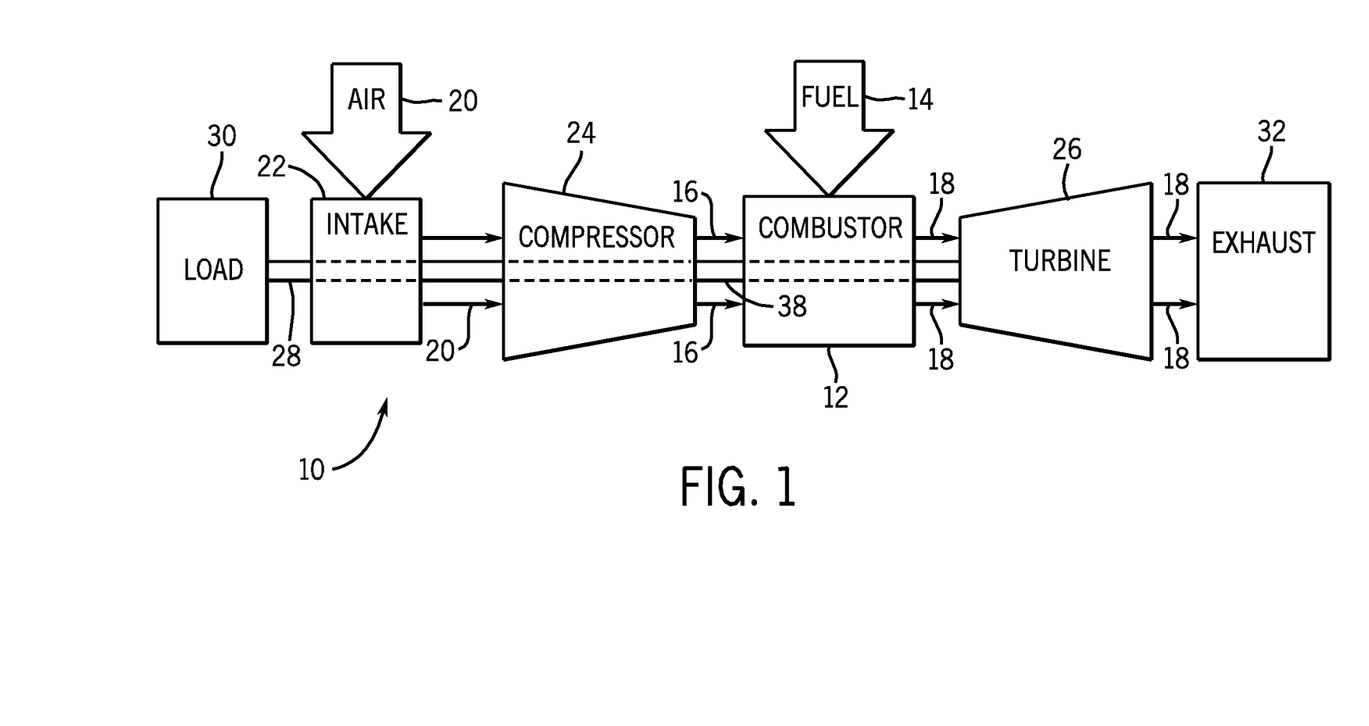
FIG. 1 is a schematic flow diagram of an embodiment of a gas turbine system that may employ sector nozzles with liquid fuel cartridges.

FIG. 1 is a block diagram of an embodiment of a gas turbine system 10 that employs sector fuel nozzles that include liquid fuel cartridges. The gas turbine system 10 may be part of a simple cycle system or a combined cycle system. The gas turbine system 10 includes a combustor 12 that combusts fuel 14 to drive the gas turbine system 10. According to certain embodiments, the fuel 14 may be a liquid or gaseous fuel, such as natural gas, light or heavy distillate oil, naphtha, crude oil, residual oil, or syngas.

Within the combustor 12, the fuel 14 may mix with pressurized air 16, shown by arrows, and ignition may occur, producing hot combustion gases 18 that power the gas turbine system 10. As discussed further below with respect to FIG. 2, the combustor 12 includes sector fuel nozzles that pre-mix the fuel 14 and the pressurized air 16 and direct the fuel-air mixture into a combustion chamber in a suitable ratio for optimal combustion, emissions, fuel consumption, and power output. Further, the sector nozzles also may include liquid fuel cartridges that direct liquid fuel into the combustion chamber.

The pressurized air 16 includes intake air 20 that enters the gas turbine system 10 through an air intake section 22. The intake air 20 is compressed by a compressor 24 to produce the pressurized air 16 that enters the combustor 12. The sector fuel nozzles may direct the fuel 14 and the pressurized air 16 into the combustion zone of the combustor 12. Within the combustion zone, the pressurized air 16 combusts with the fuel 14 to produce the hot combustion gases 18. From the combustor 12, the hot combustion gases 18 may flow through a turbine 26 that drives the compressor 24 via a shaft 28. For example, the combustion gases 18 may apply motive forces to turbine rotor blades within the turbine 26 to rotate the shaft 28. Shaft 28 also may be connected to a load 30, such as a generator, a propeller, a transmission, or a drive system, among others. After flowing through the turbine 26, the hot combustion gases 18 may exit the gas turbine system 10 through an exhaust section 32.

Figure 2:
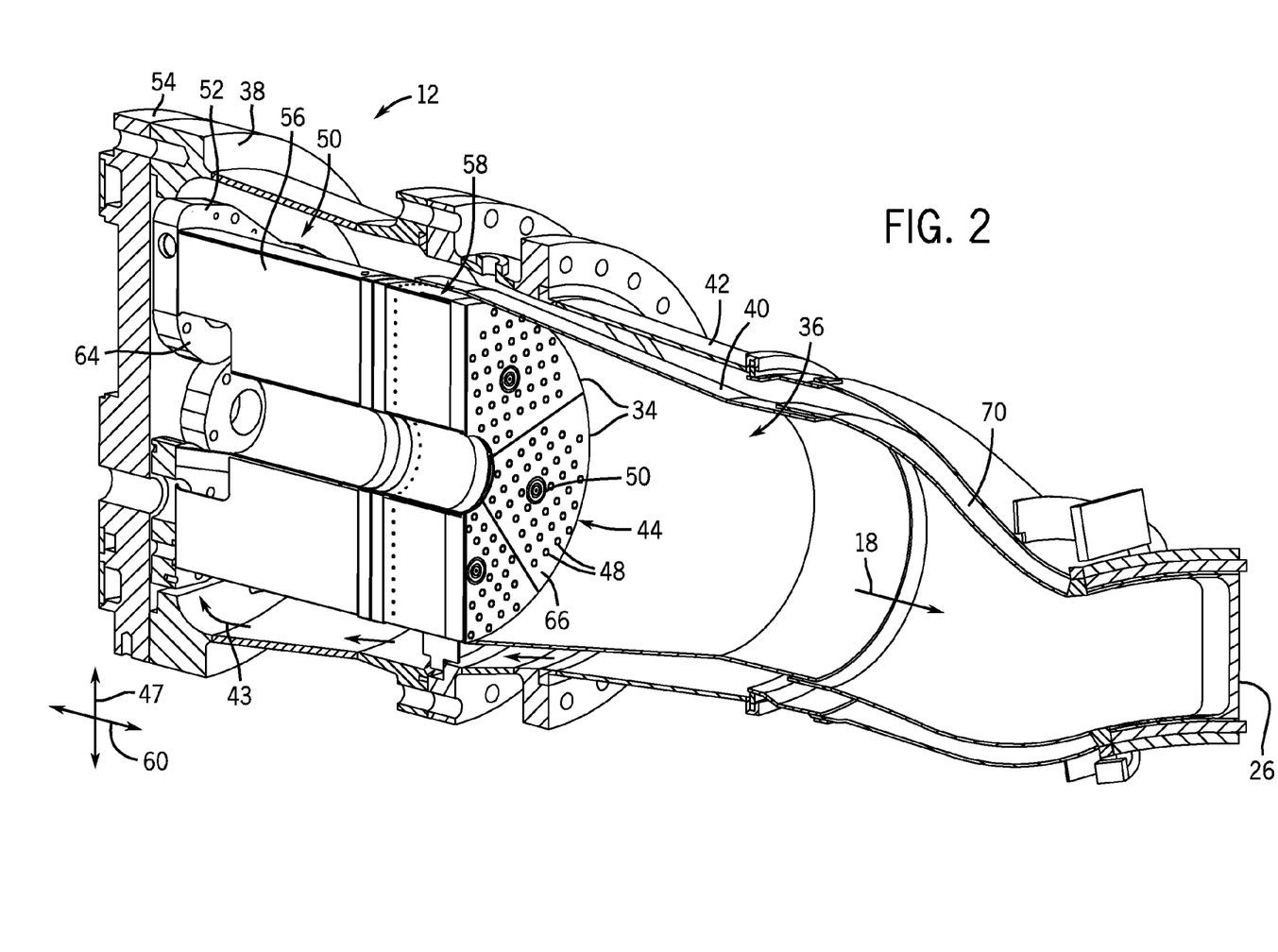
FIG. 2 is a cross-sectional view of the combustor of FIG. 1.

FIG. 2 is a cross-sectional view of an embodiment of the combustor 12. The combustor 12 includes sector nozzles 34 that inject the fuel-air mixture into a combustion chamber 36. The combustion chamber 36 is generally defined by a casing 38, a liner 40, and a flow sleeve 42. The flow sleeve 42 may be located coaxially and/or annularly about the liner 40 to direct air from the compressor into the sector nozzles 34, as generally shown by the arrows 43.

The sector nozzles 34 are arranged adjacent to one another to form a generally circular fuel nozzle assembly 44. According to certain embodiments, each sector nozzle 34 has a wedge-shaped cross section designed to abut a pair of adjacent sector nozzles 34. Further, in certain embodiments, each sector nozzle 34 may be arranged around a center fuel nozzle 46 (FIG. 4). Each sector nozzle 34 may extend outward from the center fuel nozzle 46 in the radial direction 47. Each sector nozzle 34 includes mixing tubes 48 that mix gaseous fuel and air to form a fuel-air mixture that is injected into the combustion chamber 36. One or more of the sector nozzles 34 also may include a liquid fuel cartridge 50 that injects liquid fuel into the combustion chamber 36. As discussed further below with respect to FIG. 3, the mixing tubes 48 may be disposed radially around the liquid fuel cartridge 50.

The sector nozzles 34 each include a base 52 that secures the sector nozzle 34 to an end cover 54 of the combustor 12. For example, the base 52 may abut the end cover 54 and fasteners, such as bolts, may be inserted through corresponding openings in the base 52 and the end cover 54 to secure the base 52 to the end cover 54. A shell 56 extends between the base 52 and a fuel plenum 58 in the axial direction 60. The shell 56 generally encloses an air plenum 62 (FIG. 3) that directs air from the compressor through the interior of the sector nozzles 34 to the mixing tubes 48, which extend through the fuel plenum 58 to a face plate 66. The shell 56 includes openings 64 that allow air from the compressor to enter the air plenum 62. Fuel supply passages 68 (FIG. 3) extend through the base 52 and the air plenum 62 to direct gaseous fuel into the fuel plenum 58. Within the fuel plenum 58, the gaseous fuel may enter the mixing tubes 48 through holes in the sides of the mixing tubes 48 to produce the fuel-air mixture that flows through the mixing tubes 48 to enter the combustion chamber 36. The liquid fuel cartridge 50 extends through the base 52, the air plenum 62, and the fuel plenum 58 to direct liquid fuel into the combustion chamber 36. Within the combustion chamber 36, the fuel-air mixture is combusted to produce the hot combustion gases 18. From the combustion chamber 36, the hot combustion gases 18 flow through a transition piece 70 to the turbine 26.

Figure 3:
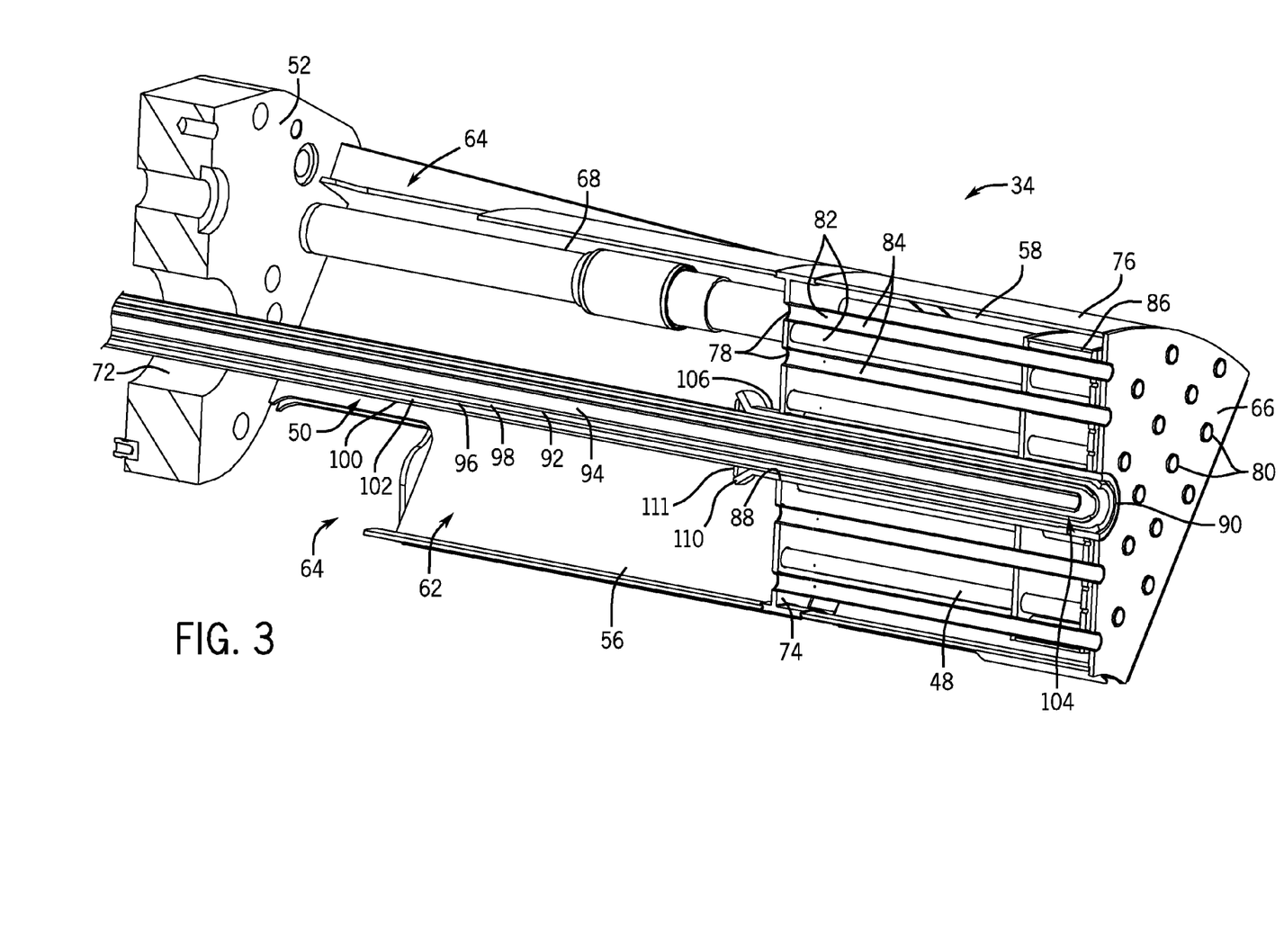
FIG. 3 is a cross-sectional view of an embodiment of a sector nozzle of the combustor of FIG. 1.
Figure 4:
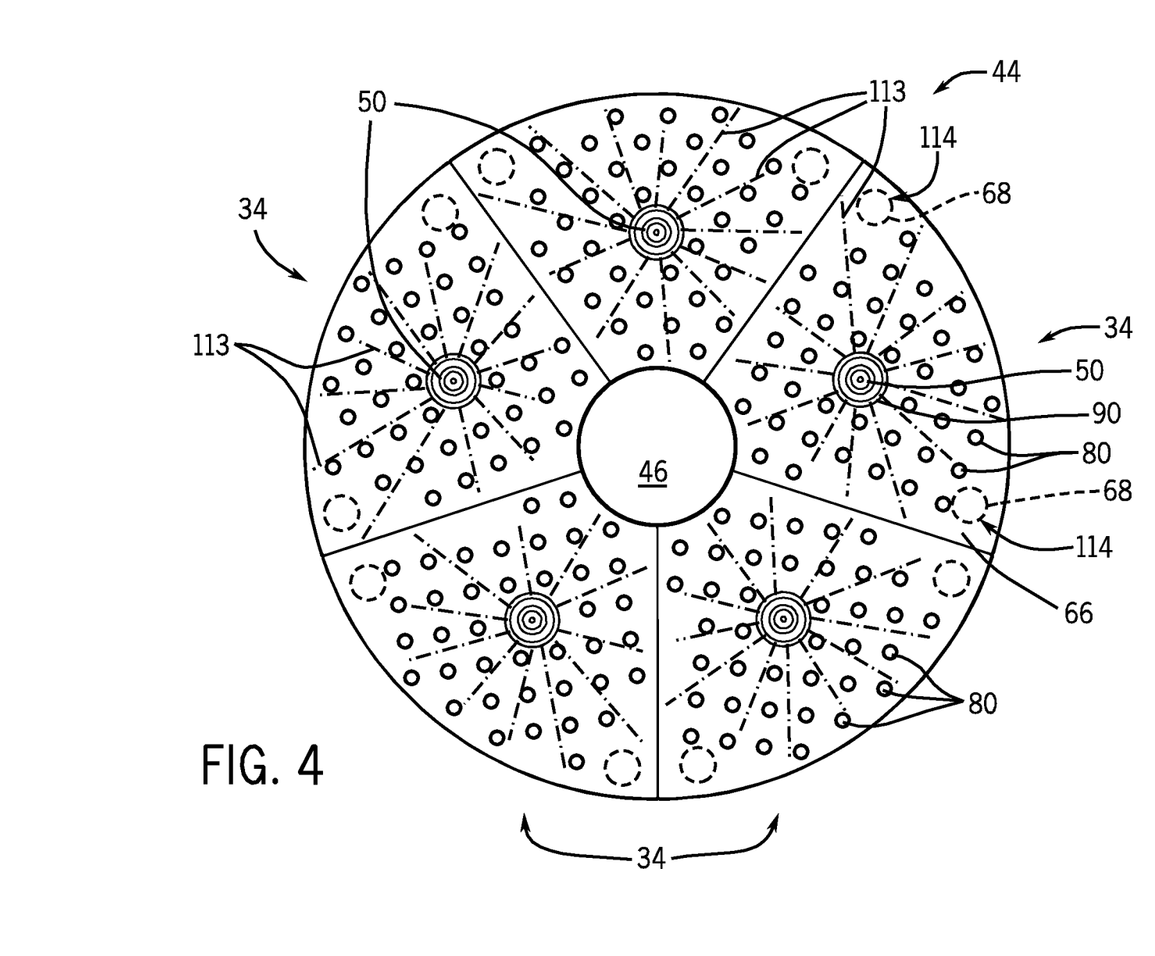
FIG. 4 is a front view of the combustor of FIG. 1 illustrating a fuel nozzle assembly with multiple sector nozzles collectively fitting together across the interior of the combustor.

FIG. 3 depicts one of the sector nozzles 34 sectioned to show the interior of the sector nozzle 34. The liquid fuel cartridge 50 extends through an aperture 72 in the base 52, through the air plenum 62, and through the fuel plenum 58 to the face plate 66. The fuel plenum 58 is generally defined by a fuel plenum plate 74 and the face plate 66. A housing 76 is coupled to the fuel plenum plate 74 and the face plate 66 to enclose the fuel plenum 58.

One or more fuel supply passages 68 extend through the base 52 to the fuel plenum 58 to direct gaseous fuel into the fuel plenum 58. The mixing tubes 48 extend through the fuel plenum 58 and are mounted in apertures 78 in the fuel plenum plate 74 and apertures 80 in the face plate 66. The mixing tubes 48 include apertures 82 in the tube walls 84 that allow fuel from the fuel plenum 58 to enter the mixing tubes 48. Air enters the sector nozzle 34 through windows 64 in the shell 56, and then flows through the air plenum 62 to enter the ends of the mixing tubes 48 through the apertures 78 in the fuel plenum plate 74. Within the mixing tubes 48, the air mixes with fuel that enters the mixing tubes 48 through the apertures 82 to produce the fuel-air mixture that is directed into the combustion chamber 36. In particular, the fuel-air mixture exits the mixing tubes 48 through the apertures 80 in the face plate 66. The fuel plenum 58 also includes a housing 86 that encloses a portion of the mixing tubes 48. The housing 86 is disposed adjacent to the face plate 66, and in certain embodiments, may include fuel that may be employed to cool the face plate 66. However, in other embodiments, the housing 86 may be omitted. Further, as described further below with respect to FIG. 8, in certain embodiments, air, rather than fuel, may be employed to cool the face plate 66.

The mixing tubes 48 are disposed radially around the liquid fuel cartridge 50, which extends through an aperture 88 in the fuel plenum plate 74 and an aperture 90 in the face plate 66. As shown in FIG. 3, the apertures 88 and 90 are centered within the fuel plenum plate 74 and the face plate 66, respectively. Accordingly, the liquid fuel cartridge 50 extends axially through the approximate center of the sector nozzle 34. However, in other embodiments, the locations of the apertures 88 and 90 may vary to dispose the liquid fuel cartridge 50 in other positions within the sector nozzle 34.

The liquid fuel cartridge 50 includes an inner tube 92 that defines a liquid fuel passage 94, an intermediate tube 96 that defines a water passage 98, and an outer tube 100 that defines an air passage 102. According to certain embodiments, liquid fuel, water, and air, such as high-pressure atomizing air, may be supplied to the liquid fuel cartridge 50 through inlets in the liquid fuel cartridge 50 that are external to the sector nozzle 34. The liquid fuel cartridge 50 also includes a nozzle portion 104 that expels the liquid fuel, water, and air, from the passages 94, 98, and 102 through the face plate 66 into the combustion chamber 36 (FIG. 2). As shown, the liquid fuel cartridge 50 includes three concentric tubes 92, 96, and 100 that define three separate flow passages 94, 98, and 102, respectively. However, in other embodiments, any number of one or more tubes may be included within the liquid fuel cartridge 50. For example, in certain embodiments, the liquid fuel cartridge 50 may include a single tube that supplies liquid fuel, or a combination of liquid fuel and water, to the combustion chamber.

The liquid fuel cartridge 50 is disposed within a mounting tube 106 that extends through the fuel plenum 58 and is mounted within the aperture 88 in the fuel plenum plate 74 and the aperture 90 in the face plate 66. The tube 106 may fit snugly within the apertures 88 and 90 to inhibit the escape of gaseous fuel through the apertures 88 and 90. The tube 106 may include a lip 110 designed to interface with mounting pegs 111 disposed on the liquid fuel cartridge 50 to facilitate proper alignment of the liquid fuel cartridge within the tube 106. Moreover, in certain embodiments, the mounting pegs 111 may have an aerodynamic cross section designed to direct air into a passage between the mounting tube 106 and the outer tube 100 of the liquid fuel cartridge 50. However, in yet other embodiments, the tube 106 may fit snugly around the outer tube 100 of the liquid fuel cartridge 50.

FIG. 4 is a front view of the fuel nozzle assembly 44 depicting the sector nozzles 34 arranged around the center fuel nozzle 46. The sector nozzles 34 are disposed adjacent to one another to form a generally circular cross section. For example, each shell 56 and housing 76 (FIG. 3) may be disposed proximate to a shell 56 and housing 76 of an adjacent sector nozzle 34. Each face plate 66 of the sector nozzle 34 includes the apertures 80 that receive ends of the mixing tubes 48 and the aperture 90 that receives the nozzle portion 104 of the liquid fuel cartridge 50. Liquid fuel 113, or a mixture of liquid fuel, water, and/or air, is sprayed radially outward from the nozzle portion 104, as generally indicated by the dashed lines. According to certain embodiments, the liquid fuel 113 may mix with the fuel-air mixture exiting the apertures 80, which may further disperse the liquid fuel 113 into the combustion chamber 36.

Each face plate 66 also includes areas 114 that are aligned with the fuel supply passages 68. These areas 114 are devoid of apertures 80 and corresponding mixing tubes 48 to allow fuel to enter the fuel plenum 58 through the fuel plenum plate 74, without being directed into a tube end. However, as described further below with respect to FIG. 7, in other embodiments, the fuel supply passages 68 may enter the fuel plenum 58 through the housing 76, and in these embodiments, substantially all of the face plate 66 may include apertures 80 and corresponding mixing tubes 48. As shown in FIG. 4, each sector nozzle 34 includes a liquid fuel cartridge 50. However, in other embodiments, only one or more of the sector nozzles 34 may include a liquid fuel cartridge 50. Further, as shown, five sector nozzles 34 are disposed about the center nozzle 46. However, in other embodiments, any number of sector nozzles 34 may be included within the fuel nozzle assembly 44. Further, in certain embodiments, the center nozzle 46 may be omitted. Moreover, in yet other embodiments, the type of liquid fuel cartridges 50 employed may vary between sector nozzles 34. For example, in certain embodiments, one sector nozzle 34 may include a liquid fuel cartridge 50 designed to direct fuel oil into the combustion chamber 36 while another sector nozzle 34 includes a liquid fuel cartridge 50 designed to direct liquid distillate into the combustion chamber 36.

Figure 5:
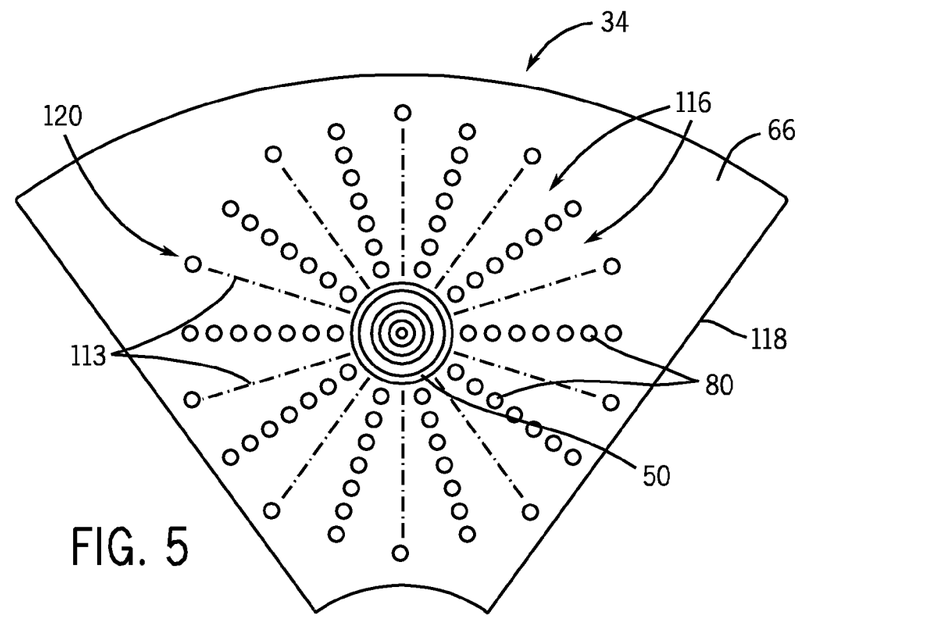
FIG. 5 is a front view of another embodiment of a sector nozzle that includes a liquid fuel cartridge.
Figure 6:
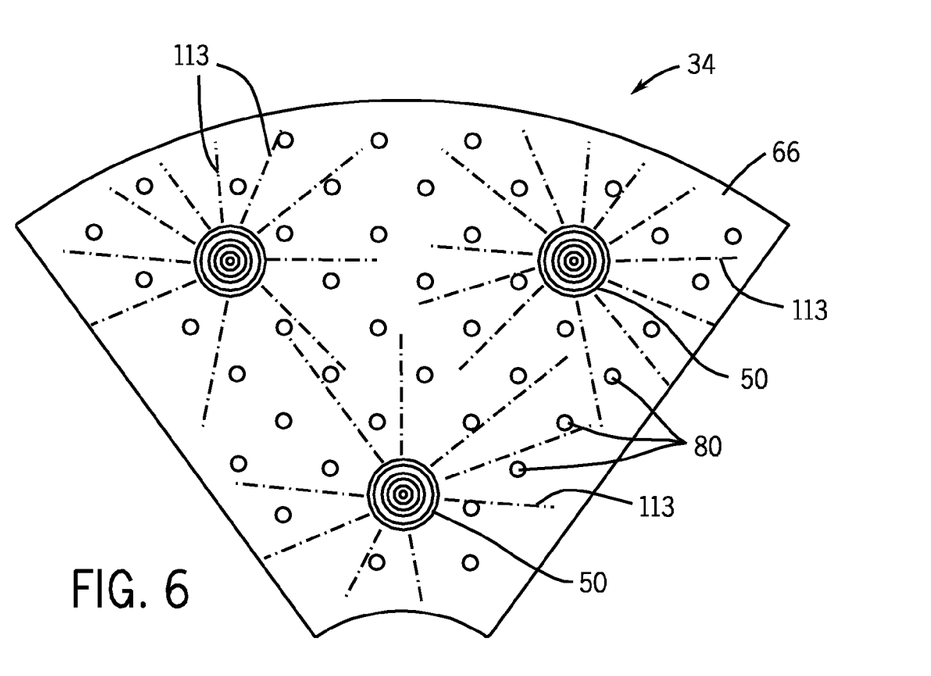
FIG. 6 is a front view of another embodiment of a sector nozzle that includes a liquid fuel cartridge.

FIGS. 5 and 6 depict alternate embodiments of sector nozzles 34 that include apertures 80 for mixing tubes 48 and apertures 90 for liquid fuel cartridges 50. As shown in FIG. 4, the apertures 80 for the mixing tubes 48 are disposed in a generally random arrangement around the aperture 90 for the liquid fuel cartridge 50. In contrast, as shown in FIG. 5, the apertures 80 are aligned radially in a patterned arrangement to form radial flow paths 116 between the apertures 80 for the liquid fuel 113. The radial flow paths 116 diverge radially outward from the liquid fuel cartridge 50, and the fuel may flow along the flow paths 116 as indicated by the dashed lines 113. According to certain embodiments, the liquid fuel 113 may travel along these flow paths 116, which may facilitate dispersion of the liquid fuel 113 towards the perimeter 118 of the face plate 66. The face plate 66 also includes a perimeter row 120 of apertures 80 that are offset from the radially aligned apertures 80. The offset apertures 80 may impede the flow of liquid fuel 113 past the perimeter 118 of the face plate 66, which may inhibit contact of the liquid fuel 113 with the liner 40, and accordingly, may reduce hot spots on the liner 40

(FIG. 2). Although the apertures 80 are radially aligned in FIG. 5, in other embodiments, the apertures 80 may be disposed in other patterned configurations, such as hexagonal patterns or staggered patterns, among others.

FIG. 6 depicts an embodiment of a sector nozzle 34 that include multiple liquid fuel cartridges 50. In particular, the apertures 80 and corresponding mixing tubes 48 are arranged around three liquid fuel cartridges 50. According to certain embodiments, including multiple liquid fuel cartridges 50 within a sector nozzle 34 may provide more efficient dispersion of the liquid fuel 113 towards the perimeter 118 relative to a single liquid fuel cartridge 50. In other embodiments, any number of 1, 2, 3, 4, or more liquid fuel cartridges 50 may be included within a sector nozzle 34.

Figure 7:
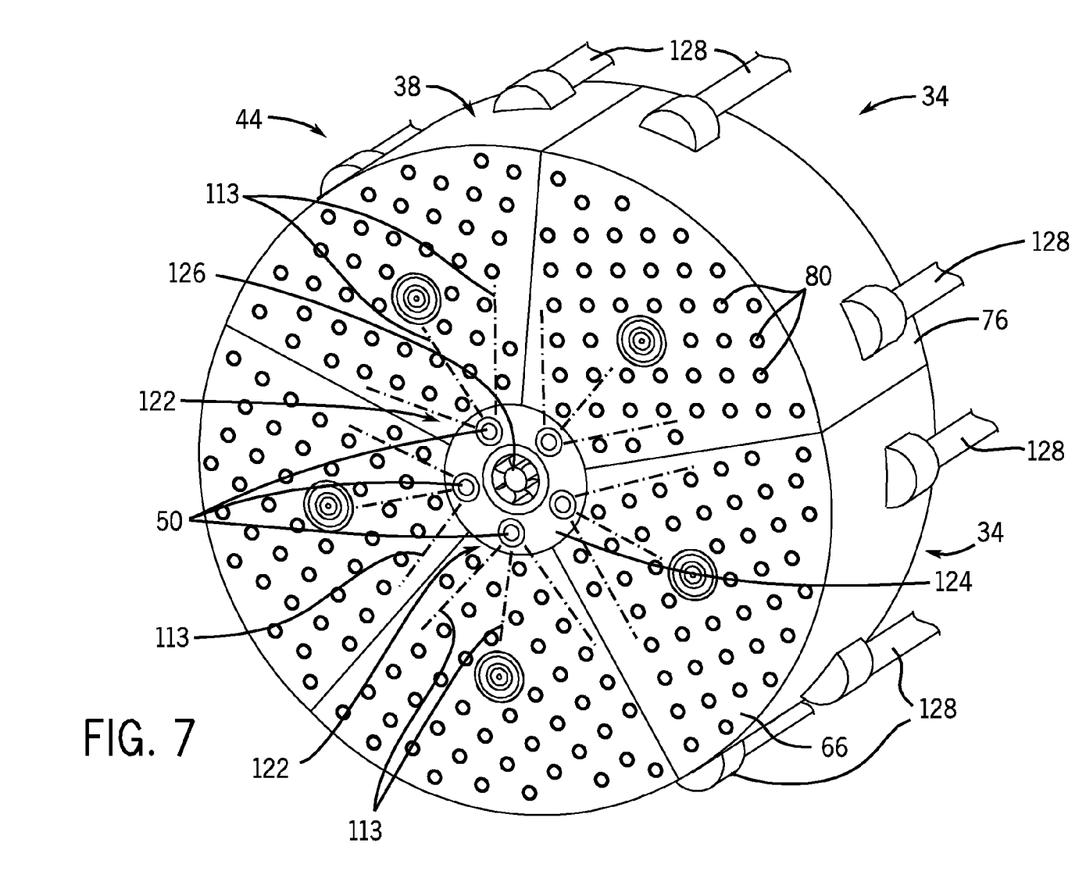
FIG. 7 is a perspective view of an embodiment of a fuel nozzle assembly that includes a liquid fuel cartridge within a center nozzle.

FIG. 7 depicts another embodiment of a fuel nozzle assembly 44. As described above with respect to FIGS. 1 through 6, each sector nozzle 34 includes the apertures 80 and corresponding mixing tubes 48 that extend through the housing 76 of the fuel plenum 58. However, rather than including liquid fuel cartridges 50 in one or more individual sector nozzles 34, a center fuel nozzle 122 includes the liquid fuel cartridges 50. In particular, the center fuel nozzle 122 includes an outer housing 124 that contains the liquid fuel cartridges 50, which are arranged around a central portion 126. As shown in FIG. 7, the central portion 126 includes a swozzle style nozzle that swirls the flow of air to enhance mixing of liquid fuel and air. However, in other embodiments, the central portion 126 may be a micro-mixer style nozzle, or other suitable type nozzle. Each of the liquid fuel cartridges 50 is designed to spray the liquid fuel 113 radially outward in a fan spray pattern toward the sector nozzles 34. As shown in FIG. 7, none of the sector nozzles 34 include a liquid fuel cartridge 50. However, in other embodiments, one or more liquid fuel cartridges 50 may be included in one or more of the sector nozzles 34 and may be employed in conjunction with the liquid fuel cartridges 50 included within the center fuel nozzle 122. Further, the apertures 80 and corresponding mixing tubes 48 may be arranged in a random configuration or patterned configuration as described above with respect to FIGS. 4 through 6.

The fuel nozzle assembly 44 also includes fuel supply passages 128 that direct fuel into the fuel plenum 58. The fuel supply passages 128 are generally similar to the fuel supply passages 68 described above with respect to FIGS. 1 and 2. However, rather than directing fuel into the fuel plenum 58 through the fuel plenum plate 74, the fuel supply passages 128 direct fuel into the fuel plenum 58 through the housing 76. Accordingly, the apertures 80 and corresponding mixing tubes 48 may be arranged over substantially all of the face plate 66, and the areas 114 devoid of the apertures 80 may be omitted. According to certain embodiments, the fuel supply passages 128 may be particularly beneficial in the sector nozzle 34 where additional mixing tubes 48 are desired.

Figure 8:
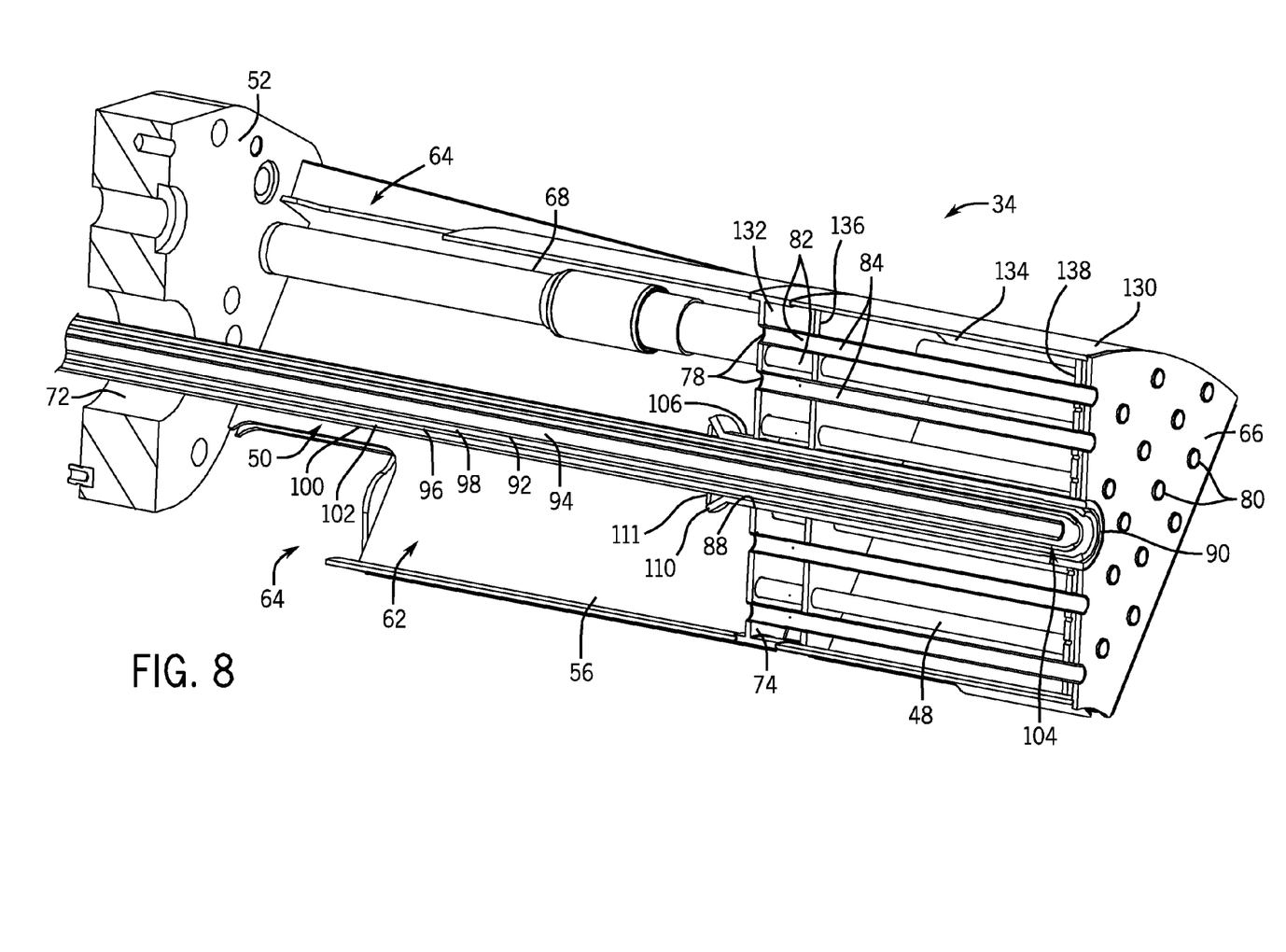
FIG. 8 is a cross-sectional view of another embodiment of a sector nozzle of the combustor of FIG. 1.

FIG. 8 depicts another embodiment of a sector nozzle 34 that can be employed within the combustor 12 (FIGS. 1 and 2). The sector nozzle 34 shown in FIG. 8 is generally similar to the sector nozzle 34 described above with respect to FIG. 3. However, rather than employing fuel to cool the face plate 66, the embodiment shown in FIG. 8 may employ air to cool the face plate 66. In particular, the sector nozzle 34 includes a housing 130 that encloses a fuel plenum 132 and an air plenum 134.

The air plenum 134 is generally defined by an interior plate 136, the housing 130, and a cooling plate 138. The interior plate is disposed generally parallel to the fuel plenum plate 74 and the face plate 66 and divides the interior of the housing 130 into the fuel plenum 132 and the air plenum 134. The housing 130 includes cooling holes 140 that direct air into the air plenum 134. The air from the air plenum 134 then flows through openings in the cooling plate 138 to provide cooling to the face plate 66.

The fuel plenum 132 is generally defined by the fuel plenum plate 74, the housing 130, and the interior plate 136. The fuel supply passages 68 direct fuel into the fuel plenum 132 where the fuel enters the mixing tubes 48 through the apertures 82. The mixing tubes 48 extend from the fuel plenum plate 74, through the fuel plenum 132, through the interior plate 36 (i.e., through apertures in the interior plate 36), through the air plenum 134, and through the cooling plate 138 (i.e., through apertures in the cooling plate 138) to the face plate 66. As described above with respect to FIG. 3, air from the air plenum 62 enters the ends of the mixing tubes 48 to produce the fuel-air mixture that exits the mixing tubes 48 through the apertures 80 in the face plate 66. The liquid fuel cartridge 50 also extends through the fuel plenum plate 74, the fuel plenum 132, the interior plate 136 (i.e., through an aperture in the interior plate 136), the air plenum 134, and the cooling plate 138 (i.e., through an aperture in the cooling plate 138) to the face plate 66 where the nozzle portion 104 expels liquid fuel, water, and air through the face plate 166 into the combustion chamber 36 (FIG. 2).

As shown in FIG. 8, the mixing tubes 48 are disposed radially around the liquid fuel cartridge 50, in a manner similar to that described above with respect to FIG. 3. However, in other embodiments, the sector nozzle 34 of FIG. 8 may be employed in conjunction with other arrangements of the liquid fuel cartridge 50 and the mixing tubes 48. For example, the mixing tubes 48 may be arranged to form radial flow paths as described above with respect to FIG. 5, or multiple liquid fuel cartridges 50 may be included within the sector nozzle 34, as described above with respect to FIG. 6. Further, the sector nozzle 34 shown in FIG. 8 may be employed in conjunction with the center fuel nozzle 122 described above with respect to FIG. 7.

As discussed above, the sector nozzles described herein may be particularly well suited to fuel nozzle assemblies that include liquid fuel cartridges and mixing tubes for producing a gaseous fuel-air mixture. In certain embodiments, the sector nozzles include liquid fuel nozzles that are disposed within the individual sector nozzles along with the mixing tubes. Further, in other embodiments, the sector nozzles may be arranged around a central nozzle including one or more liquid fuel cartridges. Accordingly, the sector nozzles provide flexibility in that gaseous fuel can be directed through the mixing tubes while liquid fuel can be directed through the liquid fuel cartridges.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A system comprising:
   a gas turbine fuel nozzle, comprising:
      a fuel plenum;
      an air plenum located upstream of the fuel plenum;
      a fuel plenum plate separating the air plenum from the fuel plenum;

a housing enclosing the fuel plenum;
an interior plate disposed within the housing to separate the fuel plenum from an interior air plenum disposed within the housing downstream of the fuel plenum;
a plurality of mixing tubes extending through the fuel plenum from the fuel plenum plate to a face plate, wherein each mixing tube of the plurality of mixing tubes has a tube wall and comprises an air inlet configured to receive air from the air plenum, a fuel inlet disposed in the tube wall within the fuel plenum to direct fuel from the fuel plenum into the mixing tube to produce a fuel-air mixture, and a fuel-air outlet configured to discharge the fuel-air mixture away from the face plate into a combustion region;
a base coupled to the gas turbine fuel nozzle upstream of the fuel plenum and the air plenum, wherein the base is configured to couple the gas turbine fuel nozzle to a combustor end cover, and
a liquid fuel cartridge extending within and through both the air plenum and the fuel plenum to the face plate, wherein the liquid fuel cartridge comprises a liquid fuel passage;
wherein the plurality of mixing tubes extends through the interior plate and the interior air plenum;
wherein the liquid fuel passage is defined by a tubular wall, and the tubular wall extends within and through the base, the fuel plenum, and the air plenum.

2. The system of claim 1, wherein the liquid fuel cartridge is substantially centered within the face plate.

3. The system of claim 1, wherein the liquid fuel cartridge is mounted within a tube forming an air passage around the liquid fuel passage.

4. The system of claim 1, wherein the fuel plenum plate and the face plate each comprise a wedge-shaped cross section.

5. The system of claim 1, comprising a fuel supply passage extending through the air plenum and the fuel plenum plate to direct a gaseous fuel into the fuel plenum.

6. The system of claim 1, comprising a turbine combustor or a gas turbine engine having the gas turbine fuel nozzle.

7. A system comprising:
a gas turbine fuel nozzle, comprising:
    a fuel plenum plate;
    a face plate spaced from the fuel plenum plate to define a fuel plenum therebetween, wherein the face plate comprises mixing tube apertures disposed circumferentially around a liquid fuel cartridge aperture;
    a plurality of mixing tubes extending through the fuel plenum from the fuel plenum plate to the face plate, wherein each mixing tube of the plurality of mixing tubes has a tube wall extending from an upstream tube end to a downstream tube end and comprises an air inlet configured to receive air from an air plenum, a fuel inlet disposed in the tube wall within the fuel plenum to direct fuel from the fuel plenum into the mixing tube to produce a fuel-air mixture, and a fuel-air outlet configured to discharge the fuel-air mixture away from the face plate into a combustion region, wherein the fuel plenum plate is disposed around the upstream tube ends of the plurality of mixing tubes and the face plate is disposed around the downstream tube ends of the plurality of mixing tubes; and
    a first liquid fuel cartridge extending through the fuel plenum plate, wherein the first liquid fuel cartridge comprises a nozzle portion disposed in the liquid fuel cartridge aperture, a liquid fuel passage coupled to the nozzle portion, and an air passage disposed around the liquid fuel passage, wherein the first liquid fuel cartridge comprises alignment pegs configured to interface with a mounting tube partially disposed in the air plenum and partially disposed in the fuel plenum, and wherein the alignment pegs are configured to interface with the mounting tube within the air plenum.

8. The system of claim 7, wherein the mixing tube apertures comprise a first set of apertures radially aligned with one another and a second set of perimeter apertures offset from the radially aligned apertures.

9. The system of claim 7, wherein the mixing tube apertures are disposed in a random configuration around the liquid fuel cartridge aperture.

10. The system of claim 7, wherein the fuel plenum plate comprises inlet apertures axially aligned with the mixing tube apertures.

11. The system of claim 7, comprising a second liquid fuel cartridge configured to direct the liquid fuel through the fuel plenum to an outlet end of the second liquid fuel cartridge disposed within the face plate.

12. The system of claim 7, comprising a turbine combustor or a gas turbine engine having the gas turbine fuel nozzle.

13. The system of claim 7, wherein the liquid fuel cartridge comprises a water passage disposed between the air passage and the liquid fuel passage.

14. A system comprising:
a gas turbine fuel nozzle, comprising:
    a plurality of sector nozzles disposed adjacent to one another to form a circular cross section, wherein each sector nozzle of the plurality of sector nozzles comprises:
    a fuel plenum;
    an air plenum located upstream of the fuel plenum;
    a fuel plenum plate separating the air plenum from the fuel plenum; and
    a plurality of mixing tubes extending through the fuel plenum from the fuel plenum plate to a face plate, wherein each mixing tube of the plurality of mixing tubes has a tube wall extending from an upstream tube end to a downstream tube end and comprises an air inlet configured to receive air from the air plenum, a fuel inlet disposed in the tube wall within the fuel plenum to direct fuel from the fuel plenum into the mixing tube to produce a fuel-air mixture, and a fuel-air outlet configured to discharge the fuel-air mixture away from the face plate into a combustion region, wherein the fuel plenum plate is disposed around the upstream tube ends of the plurality of mixing tubes and the face plate is disposed around the downstream tube ends of the plurality of mixing tubes; and
    a liquid fuel cartridge comprising a liquid fuel passage and an air passage disposed in a concentric arrangement, wherein the liquid fuel passage and the air passage are configured to output liquid fuel and air away from the face plate into the combustion region, wherein the liquid fuel cartridge is disposed within a respective sector nozzle of the plurality of sector nozzles and extends within and through both a respective air plenum and a respective fuel plenum of the respective sector nozzle.

15. The system of claim 14, wherein each sector nozzles of the plurality of sector nozzles comprises the liquid fuel cartridge substantially centered within the plurality of mixing tubes.

16. The system of claim 14, wherein the liquid fuel cartridge is disposed within a central fuel nozzle surrounded by the plurality of sector nozzles.

17. The system of claim 16, wherein the central fuel nozzle comprises a plurality of liquid fuel cartridges disposed around a central swozzle.

18. The system of claim 16, wherein the plurality of liquid fuel cartridges are configured to direct the liquid fuel radially outward toward the plurality of sector nozzles.

19. The system of claim 14, comprising a base coupled to the respective sector nozzle upstream of the respective fuel plenum and the respective air plenum, wherein the base is configured to couple the respective sector nozzle to a combustor end cover, and wherein the liquid fuel passage is defined by a tubular wall, and the tubular wall extends within and through the base, the respective fuel plenum, and the respective air plenum.

* * * * *